(12) United States Patent
Hintenlang et al.

(10) Patent No.: US 6,474,653 B1
(45) Date of Patent: Nov. 5, 2002

(54) SEAL ARRANGEMENT

(75) Inventors: Günter Hintenlang, Absteinach; Uwe Henrich, Otzberg, both of (DE)

(73) Assignee: Firma Carl Freudenberg, Weiheim (DE)

( * ) Notice: Subject to any disclaimer, the term of this patent is extended or adjusted under 35 U.S.C. 154(b) by 0 days.

(21) Appl. No.: 09/565,897

(22) Filed: May 5, 2000

(30) Foreign Application Priority Data

May 7, 1999 (DE) .......................................... 199 21 211

(51) Int. Cl.⁷ .............................................. F16J 15/16
(52) U.S. Cl. ...................... 277/433; 277/549; 277/572
(58) Field of Search ................................ 277/394, 402, 277/433, 549, 554, 558, 569, 571, 572, 573

(56) References Cited

U.S. PATENT DOCUMENTS 4,448,426 A * 5/1984 Jackowski et al.
5,269,536 A * 12/1993 Matsushima et al.
5,553,870 A * 9/1996 Czekansky et al.

FOREIGN PATENT DOCUMENTS

| DE | 62 972 | 7/1968 |
| DE | 2 414 634 | 10/1974 |
| DE | 2 322 458 | 11/1974 |
| DE | 25 00 099 | 7/1976 |
| EP | 0 012 133 | 9/1981 |

* cited by examiner

Primary Examiner—Robert J. Sandy
Assistant Examiner—Karlena D. Schwing
(74) Attorney, Agent, or Firm—Kenyon & Kenyon

(57) ABSTRACT

A seal arrangement for a shaft having a broad rpm range, supported in a housing, in particular for axle drives. A radial shaft seal, arranged in the housing bore hole, seals the shaft bearing space from loss of lubricant. A baffle plate, joined to the shaft, and having a lip seal, is aligned radially to the inside, which under the effect of centrifugal force lifts off from its sealing surface at higher rotational speeds of the shaft.

20 Claims, 2 Drawing Sheets

SEAL ARRANGEMENT

BACKGROUND OF THE INVENTION

The invention relates to a seal arrangement for a shaft having a broad rpm range, supported in a housing, in particular for axle drives.

For the sealing of shafts, a multiplicity of seals are often used, which are primarily intended to protect the shaft bearing or the axle drive from loss of lubricant and, in addition, to prevent contaminants from penetrating into the shaft bearing arrangement.

Among the seal arrangements that are often used are radial shaft seals, which are inserted into the housing bore hole and contact the periphery of the shaft at a flexible lip seal. However, these seals are less suited for axle drive seals because they prevent the penetration of contaminants only to a limited extent. The arrangement of one or a plurality of additional radial protective lips is also not completely satisfactory.

Consequently, so-called cassette seals have begun to be used, in which a sleeve is placed on the shaft and is provided with a radial flange as a baffle plate. The primary lip seal, which contacts the circumferential surface of the sleeve at the sealing lip, is provided with a protective lip which comes into contact with the radial flange. The axially oriented protective lip is to prevent the penetration of contaminants. In addition, as soon as the shaft begins to rotate, contaminants, dust, and also water that has found its way in are expelled by the radial flange, which represents a baffle plate.

All of the heretofore known embodiments have in common that the radial or also axial protective lips heat up intensely in response to high rotational speeds and are subjected to excessive wear. As a result, the effectiveness and service life of the seals are reduced.

SUMMARY OF THE INVENTION

The invention is directed to the task of creating a seal arrangement which provides as reliable a seal as possible and is, in particular, little subject to wear. A seal arrangement is configured and is provided, in particular, for axle drives. However, if necessary it can also be used in other locations if the shafts are subject to the threat of soiling at rest and in the entire rpm range. The seal arrangement is therefore generally suitable for shafts having a broad rpm range. The seal, arranged in the housing bore hole for sealing off the shaft bearing space from loss of lubricant, and a baffle plate, joined to the shaft and having, oriented radially towards the inside, a lip seal which under the effect of centrifugal force lifts off from its sealing surface in response to increasing rotational speeds of the shaft. The material for the lip seal is selected so that the lip seal, when the shaft is at rest or rotating at relatively slow speeds, sealingly contacts the sealing surface assigned to it as a result of its internal tension. The lip seal is joined to the baffle plate and, at higher rotational speeds, widens, with the consequence that the sealing lips separate from the sealing surface. As a result, unnecessary friction between the sealing lips and the sealing surface is avoided, and a heating of the sealing lips does not take place.

The radial shaft seal in its fundamental design is composed of an external holding part, inserted into the housing bore hole in a press fit, and an interior lip part, supporting the primary sealing lip for the shaft. The holding part is preferably provided with a reinforcing ring, which is at least partially covered by an elastic polymer packing. The primary sealing lip of the lip part can be encircled by a wire filament spring (all well-known components).

The baffle plate, cooperating with the seal, is secured on a shaft shoulder via a sleeve or the like. At its external edge, the baffle plate has an exterior ring that is aligned with the radial shaft seal, the interior edge of the exterior ring producing a labyrinth seal in cooperation with the polymer packing of the holding part. It is expedient if this labyrinth seal is formed by a gap, aligned axially and radially, between a protruding ring bead of the holding part and a right-angle bend at the interior edge of the exterior ring, aligned radially to the outside and resting inside the ring bead. On the holding part of the radial shaft seal, therefore, a ring bead protruding to the outside is present, which overlaps the interior end of the exterior ring secured on the baffle plate. Between the holding part having the ring bead and the right-angle bend of the exterior ring, a labyrinth gap is therefore formed. The exterior ring of the baffle plate is preferably enclosed by a polymer, which at the interior edge of the exterior ring can replace the right-angle bend through a corresponding configuration.

According to one advantageous aspect of an embodiment of the invention, the lip seal is integrally connected to the polymer of the exterior ring. This connection is configured and arranged so that the connection permits a rotating motion (a lifting off) of the lip seal, beginning at a predetermined shaft rotational speed. For example, this can be achieved through because the connection is composed of a conical tapering of the lip seal as it approaches the connecting point. In general, the design of the lip seal can be compared to a conventional sealing lip. However, it is advantageous if the lip seal is provided with two protective lips or sealing edges, in order, in every case, to prevent the penetration of contaminants, particularly water.

The sealing surface for the lip seal is formed by a metal slide sleeve that is aligned co-axially with respect to the shaft and is joined to the lip part of the radial shaft seal. This slide sleeve on its interior surface can at least partially be lined with the polymer material of the lip part. It is expedient to provide it with two radial protective lips to strengthen the barrier against contaminants.

The seal arrangement according to the present invention is particularly suited for axle drives and transfer cases of so-called off-road vehicles. It reliably prevents the penetration of contaminants and also water when the shaft is at rest or rotating at lower speeds, as a result of the fact that the lip seal prevents the penetration of water. The labyrinth seal also contributes in this respect due to the fact that it considerably reduces the pressure of the inflowing water. As the rotational speed of the shaft increases, the baffle plate and also the right-angle bend at the end of the exterior ring of the baffle plate more and more take effect, until finally neither contaminants nor fluids can penetrate into the interior of the seal. In response to the increasing rotational speeds of the baffle plate, the lip seal begins to widen, or to rotate about its connecting point, so that the sealing lips lift off from the sealing surface of the slide sleeve. In this context, the sealing lips are supported on the interior circumference of the exterior ring. The friction between the lip seal and the slide sleeve is therefore eliminated.

Within the framework of the conception of the invention, other configurations of course are also conceivable, it being possible, for example, that the exterior ring of the baffle plate is configured conically having a radius that increases to the interior of the radial shaft seal. Also possible are other configurations of the lip seal or of the slide sleeve.

BRIEF DESCRIPTION OF THE DRAWINGS

The invention is explained in greater detail on the basis of an exemplary embodiment depicted in the drawings.

DETAILED DESCRIPTION OF THE INVENTION

Figure 1:
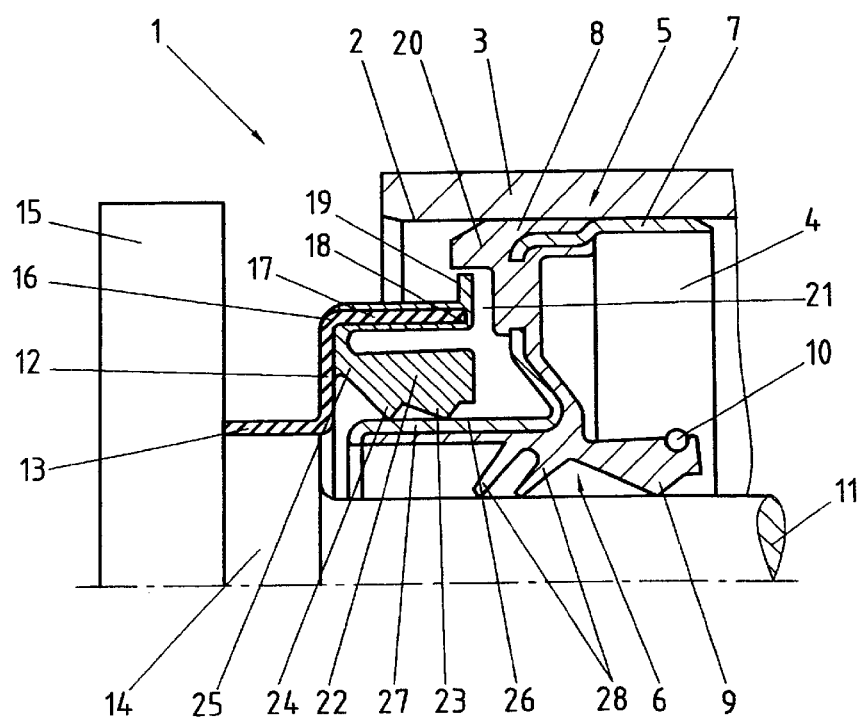
FIG. 1 depicts a seal arrangement in cross-section, constructed according to the principles of the invention, in which the shaft is at rest.

Seal arrangement 1 depicted in cross-section in FIG. 1 is provided for the axle drive of an off-road vehicle (not sketched in further detail). Radial shaft seal 4 is inserted, in a force fit, into housing bore hole 2 of bearing housing 3. Seal 4 is essentially composed of holding part 5 and lip part 6. Holding part 5 has reinforcing ring 7, which is at least partially enclosed by elastic polymer packing 8. Lip part 6 primary sealing lip 9, which is encircled by wire filament spring 10. Primary sealing lip 9 contacts shaft 11.

Baffle plate 12, composed of a radial flange, is joined to shaft 11. For this purpose, baffle plate 12 has sleeve 13, which is mounted on shaft shoulder 14. Wheel hub 15 is joined to shaft shoulder 14. Baffle plate 12 at its exterior edge 16 has exterior ring 17, which is enclosed by polymer 18. This polymer enclosure 18 at the interior edge of exterior ring 17 has a ring extension 19. This ring extension 19 is overlapped by ring bead 20, which protrudes from polymer packing 8 of holding part 5. In this manner, between polymer packing 8 having ring bead 20 and the interior end of exterior ring 17, having its polymer 18 and the ring extension 19, a gap 21 arises which produces a labyrinth seal.

Lip seal 22, radially aligned to the interior, is secured on baffle plate 12. The lip seal is made of the same material as polymer 18 on exterior ring 17 and is integrally configured in one piece with polymer 18. Lip seal 22 has roughly the shape of sealing lip 9. However, it is not provided with a wire filament spring. In order to achieve a good sealing effect, it is provided with two sealing edges 23 and 24. Towards its connection 25 to the baffle plate, lip seal 22 has a conical tapering. This conical tapering permits a slight swiveling of lip seal 22 about its connecting point 25, if shaft 11 and therefore baffle plate 12 rotate at a corresponding speed.

Sealing surface 26 for lip seal 22 is formed from metal slide sleeve 27, aligned co-axially with respect to shaft 11. Slide sleeve 27 is secured on lip part 6. On its interior surface opposite sealing surface 26, slide sleeve 27 is lined with polymer 8 of lip part 6. It is additionally provided with two radial protective lips 28. These function as a supplemental contamination barrier.

In FIG. 1, the sealing arrangement is depicted in the configuration that it adopts when shaft 11 is at rest or is rotating at low speeds.

Figure 2:
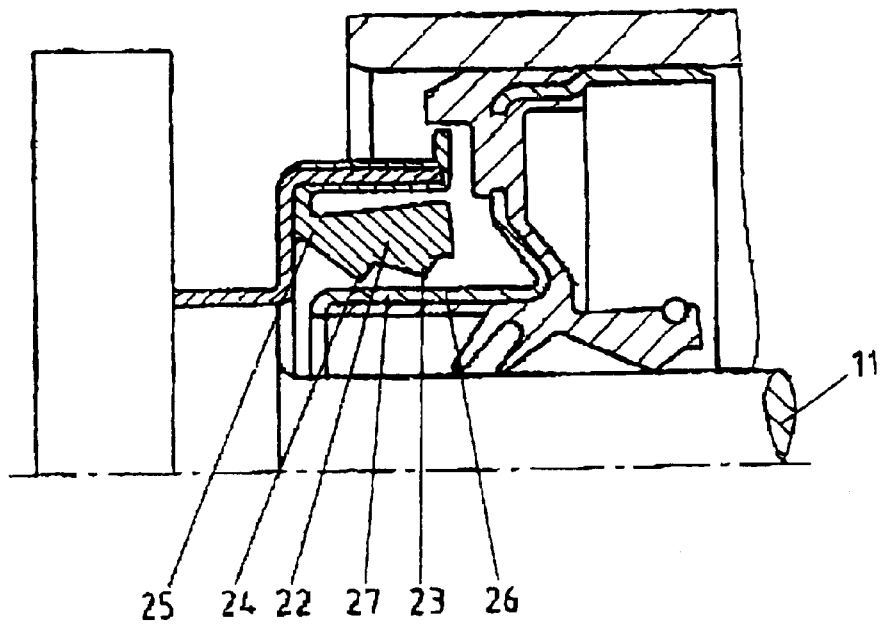
FIG. 2 depicts the seal arrangement according to FIG. 1 at a higher rotational speed of the shaft.

FIG. 2 depicts the same embodiment as FIG. 1, but with the stipulation that shaft 11 has reached a rotational speed at which seal 22 has lifted off from sealing surface 26. As a result, it is slightly swivelled with respect to collision point 25, and sealing lips 23 and 24 no longer contact sealing surface 26 of slide sleeve 27. Lip seal 22 has widened slightly, which is made possible through the selection of an appropriate material. At a predetermined rotational speed, lip seal 22 is supported at the interior periphery of exterior ring 17.

What is claimed is:

1. A seal arrangement for a shaft having a broad rpm range, supported in a housing, in particular for axle drives, comprising:
    a radial shaft seal, configured to be arranged in a housing bore hole, for sealing a shaft bearing space against loss of lubricant;
    a baffle plate, joined to the shaft, having a lip seal aligned radially to the inside, the lip seal having a sealing surface, wherein under the effect of centrifugal force the lip seal lifts off from the sealing surface in response to higher rotational speeds of the shaft.

2. The seal arrangement as recited in claim 1, wherein the radial shaft seal comprises an exterior holding part, inserted into the housing bore hole in a force fit, and an interior lip part, supporting a primary sealing lip for the shaft.

3. The seal arrangement as recited in claim 2, wherein the holding part is provided with a reinforcing ring, which is surrounded at least partially by an elastic polymer packing.

4. The seal arrangement as recited in claim 1, wherein the lip comprises a primary sealing lip, which is encircled by a wire filament spring.

5. The seal arrangement as recited in claim 1, wherein the baffle plate is secured on a shaft shoulder via a sleeve.

6. The seal arrangement as recited in claim 1, wherein the baffle plate at an exterior edge has an exterior ring, aligned with the radial shaft seal, an interior edge of the exterior ring, in cooperation with the polymer packing of the holding part, producing a labyrinth seal.

7. The seal arrangement as recited in claim 6, wherein the labyrinth seal is formed by a gap, oriented axially and radially, between a protruding ring bead of the holding part and a right-angle bend, aligned radially to the outside and resting inside the ring bead, on the interior edge of the exterior ring.

8. The seal arrangement as recited in claim 6, wherein the exterior ring of the baffle plate is enclosed by a polymer, which on the interior edge of the exterior ring forms a ring extension, replacing the right-angle bend.

9. The seal arrangement as recited in claim 8, wherein the lip seal is integrally-joined to the polymer via a joint that permits a rotational motion of the lip seal, beginning at a predetermined shaft rotational speed.

10. The seal arrangement as recited in claim 9, wherein the joint consists of a conical tapering of the lip seal towards the connecting point.

11. The seal arrangement as recited in claim 8, wherein the lip seal is provided with two protective lips.

12. The seal arrangement as recited in claim 6, wherein the exterior ring of the baffle plate is configured conically as having a radius that increases to the interior of the radial shaft seal.

13. The seal arrangement as recited in claim 1, wherein the sealing surface for the lip seal is formed by a metal slide sleeve that is joined to the lip part of the radial shaft seal and is aligned co-axially with respect to the shaft.

14. The seal arrangement as recited in claim 13, wherein the sealing lip lifts off from the slide sleeve when a predetermined rotational speed is reached and is supported on the interior periphery of the exterior ring when the rotational speed continues to increase.

15. The seal arrangement as recited in claim 1, wherein the slide sleeve on an interior surface is at least partially lined with the polymer of the lip part and is preferably provided with two radial protective lips.

16. A seal arrangement for a shaft having a broad rpm range, supported in a housing, in particular for axle drives, comprising:
    a radial shaft seal, configured to be arranged in a housing bore hole, for sealing a shaft bearing space against loss of lubricant;

a baffle plate, joined to the shaft, having a lip seal aligned radially to the inside, the lip seal having a sealing surface, wherein under the effect of centrifugal force the lip seal lifts off from the sealing surface in response to higher rotational speeds of the shaft, and wherein the baffle plate at an exterior edge has an exterior ring, aligned with the radial shaft seal, an interior edge of the exterior ring, in cooperation with the polymer packing of the holding part, producing a labyrinth seal, and wherein the labyrinth seal is formed by a gap, oriented axially and radially, between a protruding ring bead of the holding part and a right-angle bend, aligned radially to the outside and resting inside the ring bead, on the interior edge of the exterior ring.

17. A seal arrangement for a shaft having a broad rpm range, supported in a housing, in particular for axle drives, comprising:

a radial shaft seal, configured to be arranged in a housing bore hole, for sealing a shaft bearing space against loss of lubricant;

a baffle plate, joined to the shaft, having a lip seal aligned radially to the inside, the lip seal having a sealing surface, wherein under the effect of centrifugal force the lip seal lifts off from the sealing surface in response to higher rotational speeds of the shaft, and wherein the baffle plate at an exterior edge has an exterior ring, aligned with the radial shaft seal, an interior edge of the exterior ring, in cooperation with the polymer packing of the holding part, producing a labyrinth seal, and wherein the exterior ring of the baffle plate is enclosed by a polymer, which on the interior edge of the exterior ring forms a ring extension.

18. The seal arrangement as recited in claim 17, wherein the lip seal is integrally joined to the polymer via a joint that permits a rotational motion of the lip seal, beginning at a predetermined shaft rotational speed.

19. The seal arrangement as recited in claim 18, wherein the joint consists of a conical tapering of the lip seal towards the connecting point.

20. The seal arrangement as recited in claim 17, wherein the lip seal is provided with two protective lips.

* * * * *

UNITED STATES PATENT AND TRADEMARK OFFICE
CERTIFICATE OF CORRECTION

PATENT NO.   : 6,474,653 B1
DATED        : November 5, 2002
INVENTOR(S)  : Hintenlang et al.

It is certified that error appears in the above-identified patent and that said Letters Patent is hereby corrected as shown below:

Column 1,
Line 48, after "The" insert -- new seal arrangement is essentially composed of a radial shaft --.

Signed and Sealed this

Third Day of February, 2004

JON W. DUDAS
*Acting Director of the United States Patent and Trademark Office*